United States Patent [19]
Moss et al.

[11] Patent Number: 6,075,300
[45] Date of Patent: *Jun. 13, 2000

[54] COMBINED ARMATURE AND STRUCTURALLY SUPPORTIVE COMMUTATOR FOR ELECTRIC MOTORS

[75] Inventors: Graham D. Moss, Dutton; Scott Campbell, London, both of Canada

[73] Assignee: Siemens Canada Limited, Mississauga, Canada

[ * ] Notice: This patent is subject to a terminal disclaimer.

[21] Appl. No.: 09/112,112

[22] Filed: Jul. 8, 1998

[51] Int. Cl.$^7$ .......................... H02K 13/04; H02K 13/00; H01R 39/06; H01R 43/06
[52] U.S. Cl. .......................... 310/136; 310/128; 310/237; 29/597
[58] Field of Search .................... 310/112, 136, 310/237, 233, 234, 235, 236, 128, 148, 91, 127, 135, 264, 267; 388/836; 29/597

[56] References Cited

U.S. PATENT DOCUMENTS

| | | | |
|---|---|---|---|
| 2,999,956 | 9/1961 | Faulhaber | 310/235 |
| 3,314,132 | 4/1967 | Van Dorn | 29/155.54 |
| 3,562,570 | 2/1971 | Frank | 310/234 |
| 3,861,027 | 1/1975 | Allen | 29/597 |
| 4,088,914 | 5/1978 | Aoki | 310/264 |
| 4,286,375 | 9/1981 | Nakamura et al. | 29/597 |
| 4,349,759 | 9/1982 | Arnold et al. | 310/233 |
| 4,481,439 | 11/1984 | Stokes | 310/233 |
| 4,663,834 | 5/1987 | Stokes | 29/597 |
| 4,769,566 | 9/1988 | Matsuda | 310/40 MM |
| 4,890,026 | 12/1989 | Isozumi | 310/233 |
| 4,910,790 | 3/1990 | Kershaw | 388/836 |
| 5,157,299 | 10/1992 | Gerlach | 310/237 |
| 5,164,623 | 11/1992 | Shkondin | 310/67 R |
| 5,434,463 | 7/1995 | Horski | 310/248 |
| 5,552,652 | 9/1996 | Shimoyama et al. | 310/237 |
| 5,949,174 | 9/1999 | Moss et al. | 310/233 |

*Primary Examiner*—Nestor Ramirez
*Assistant Examiner*—Dang Dinh Le

[57] ABSTRACT

A combined armature and commutator assembly for an electric motor is disclosed wherein an armature core is formed of a plurality of laminate plate members defining a central opening and having armature windings wound around the armature core. A disc-shaped commutator is provided and adapted for contact by electrically conductive brushes of the motor for conducting electrical current to the armature windings. The commutator is positioned within the generally central opening of the armature and is attached to the armature core by an interference fit relation to rotatability support the armature core on a rotor shaft of the electric motor thereby transmitting all torque directly from the armature core to the commutator and thereby to the rotor shaft. The combined armature and commutator may be incorporated into a single speed or a multiple speed motor.

29 Claims, 3 Drawing Sheets

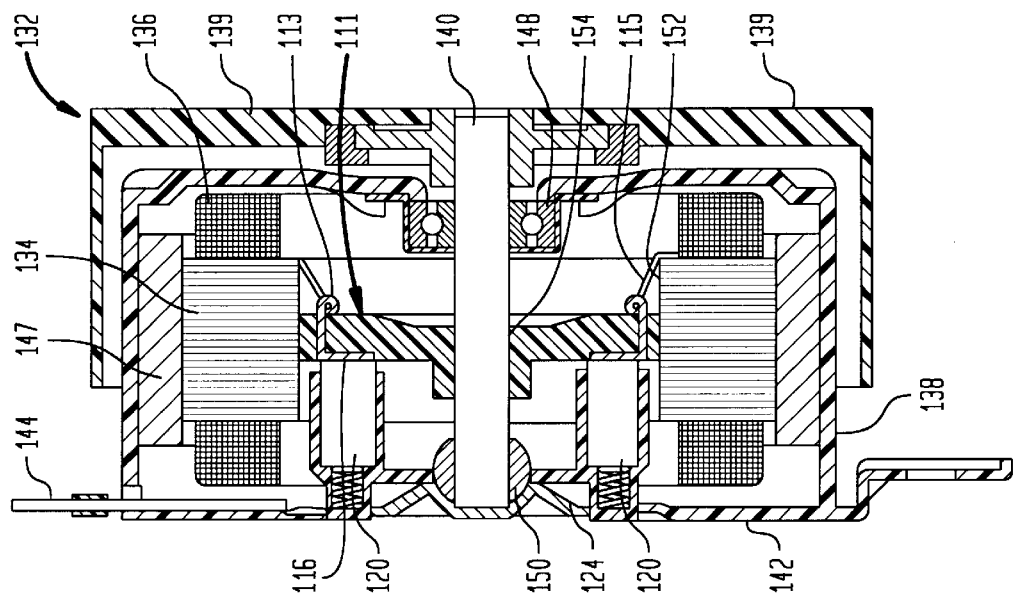
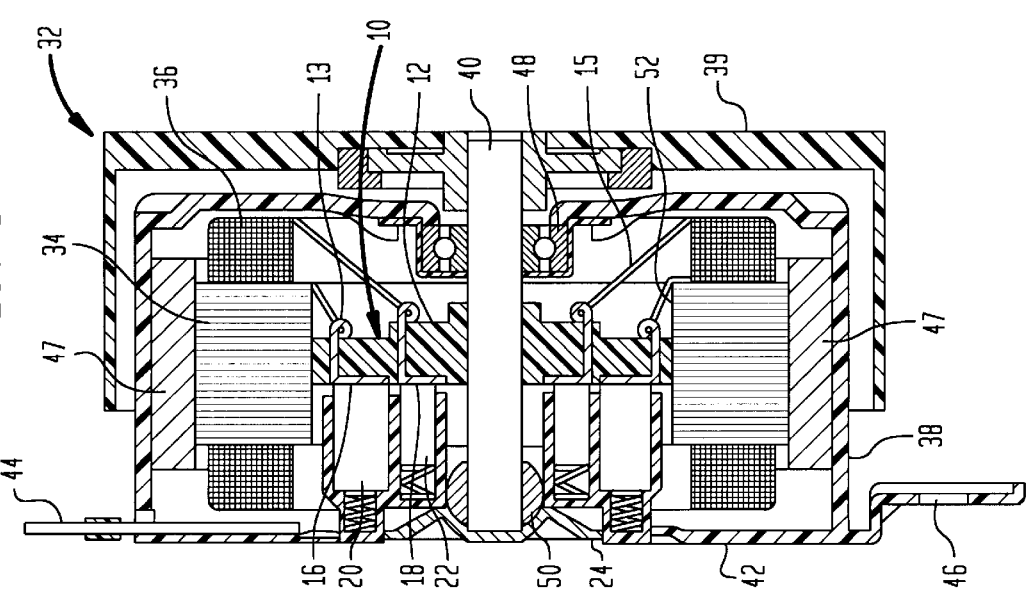

COMBINED ARMATURE AND STRUCTURALLY SUPPORTIVE COMMUTATOR FOR ELECTRIC MOTORS

BACKGROUND OF THE INVENTION

1. Technical Field

The present application relates to armatures and commutators for electric motors. In particular, the application is directed to a combined armature and commutator wherein the armature is structurally supported for rotation by the commutator.

2. Description of Related Art

Electric motors and their construction are generally well known. U.S. Pat. No. 5,434,463 relates to a representative direct current motor which utilizes a commutator in combination with crescent shaped brushes. The commutator is positioned within a core-type armature. The disclosure of U.S. Pat. No. 5,434,463 is incorporated herein by reference.

Commonly assigned U.S. Pat. No. 4,910,790 relates to a two speed motor which incorporates first and second respective commutators and brush set to accommodate each speed of the motor. The disclosure of U.S. Pat. No. 4,910,790 is incorporated herein by reference.

U.S. Pat. No. 5,095,611 relates to a method of assembling an electric motor to eliminate a separate end play adjustment wherein permanent magnets act on the armature laminations to urge the motor shaft in one direction so that the entire end play appears at only one end of the shaft. The disclosure of U.S. Pat. No. 5,095,611 is incorporated herein by reference.

Commonly assigned, concurrently filed U.S. patent application entitled Commutators for Electric Motors and Method of Manufacturing Same, the disclosure of which is incorporated herein by reference, is directed to a novel method of manufacturing commutators which eliminates costly manufacturing steps and loss of material. Commonly assigned, concurrently filed application entitled Commutator for Two Speed Electric Motor and Motor Incorporating Same, the disclosure which is incorporated herein by reference, is directed to a novel commutator for use in two speed motors, which minimizes the axial space utilized by the commutator.

In electric motors the armature and commutator are generally spaced apart from each other axially along the motor shaft and wired in a manner to function as part of the motor. The armature is generally mounted to the motor shaft for rotation within a magnetic field created by permanent magnets. The armature is usually rotatably supported on the shaft by a plurality of radial spoke-like members. As is well known, the armature generally includes a core comprised of a stack of laminations formed of a ferromagnetically compatible material such as steel, and secured together to form the core. Generally the steel laminations have a central opening and selected laminations have radial spoke-like members. The laminations are spaced in a prearranged manner such that the spoke-like members may be used to support the entire stack of laminations on a bearing mounted rotor shaft. The core of laminations is wrapped with electrically conductive armature wires to produce the electric field required to produce rotary motion of the armature on the bearing mounted rotor shaft. Alternatively, the core may be made of a solid ferromagnetic material.

The commutator can be of various types. One type is in the form of a disk-like support member carrying commutator segments on one surface of the disk-like support member. Another type is the barrel-type commutator which has a cylindrical structure and carries commutator segments on the outer cylindrical surface and is mounted on the rotor shaft adjacent to, and generally independently of the armature. In either arrangement the armature and the commutator utilize separate spaces along the axial length of the shaft and therefore cause the motor to be longer in length than would otherwise be desirable.

U.S. Pat. No. 4,286,375 relates to a method of manufacturing a coreless armature wherein the armature comprises a cylindrically wound insulation coated coil as a main armature body. A disk-shaped commutator carrying plate member is positioned within the insulation-coated coil body and pressure is applied in all radial inward directions such that a compressive force is applied to the outer periphery of the coil body to cause the coil windings to partly bulge into ring-shaped spaces surrounding the commutator carrying member. The method of U.S. Pat. No. 4,286,375 relates to manufacturing a commutator carrying member within a coreless armature. The method however, does not contemplate a core-type armature which utilizes a core comprised of a plurality of ferromagnetic plates secured together to form the core and having armature windings wound therearound. The present invention relates to a combined armature and commutator which structurally supports the armature for rotation on the rotor shaft of electric motors of the type which utilize a core-type armature.

BRIEF SUMMARY OF THE INVENTION

The invention relates to a combined armature and commutator assembly for an electric motor, which comprises, an armature core formed of a plurality of laminate plate members having armature windings positioned around the armature core, and a commutator adapted for contact by electrically conductive brushes of the motor for conducting electrical current to the armature windings. The commutator is attached to the armature core to rotatably support the armature core on a rotor shaft of the electric motor. Preferably the commutator is formed of a generally annular shaped structural member having a plurality of conductive commutator segments positioned thereon for contact with the electrically conductive brushes of the motor. The generally annular shaped structural member has a disc-like configuration and is molded of an electrically insulating material. Further, the annular shaped structural member has at least two opposed annular shaped surface portions, and the commutator segments are positioned on one of the annular shaped surface portions. Preferably commutator segments each have a configuration in the form of a sector of an annulus.

The commutator segments are positioned on the commutator in a circular array on the surface portion of the disc-like structural support member for contact with the electrically conductive brushes of the motor. At least two such circular arrays of commutator segments are positioned on the surface portion of the disc-like structural support member for operation within a two speed motor, one circular array being associated with a first motor speed, and the second circular array being associated with a second motor speed. The disc-like structural support member is preferably molded of a resinous material. Further, laminate plate members define a generally central opening for the armature core and the commutator is positioned within the generally central opening and is dimensioned to be received within the opening in the armature core in interference relation therewith. Other means to attach the commutator to the armature core are contemplated.

An electric motor is disclosed which comprises a stator having a generally cylindrical housing having one end open and the other end closed. A rotor having a rotor shaft includes a combined armature and commutator assembly positioned within the housing and includes an armature core formed of a plurality of laminate plate members defining a generally central opening and having armature windings positioned around the armature core, and a commutator having a plurality of electrical contacts and adapted for contact by conductive brushes of the motor for conducting electrical energy to the armature windings. The commutator is positioned within the generally central opening of the armature and is attached by interference fit relation to the armature core for rotatability supporting the armature core on a rotor shaft. A plurality of brushes are positioned for electrical contact with the conductive contacts of the commutator and means is provided for rotatably mounting the commutator on the rotor shaft whereby rotation of the armature core and windings causes corresponding rotation of the commutator. A plurality of permanent magnets are positioned within the housing and around the rotor to provide a magnetic field within the housing.

BRIEF DESCRIPTION OF THE SEVERAL VIEWS OF THE DRAWINGS

Preferred embodiments of the invention are described hereinbelow with reference to the drawings wherein:

FIG. 3 is a cross-sectional view taken along line 3—3, of FIG. 2, illustrating a first embodiment of the invention wherein a two speed motor is accommodated by a dual speed commutator combined with the armature in accordance with the present invention; and FIG. 4 is a cross-sectional view similar to FIG. 3 of a one speed motor which utilizes a combined armature and commutator assembly according to the invention, the commutator being of a single speed-type.

DETAILED DESCRIPTION OF THE INVENTION

Figure 1:
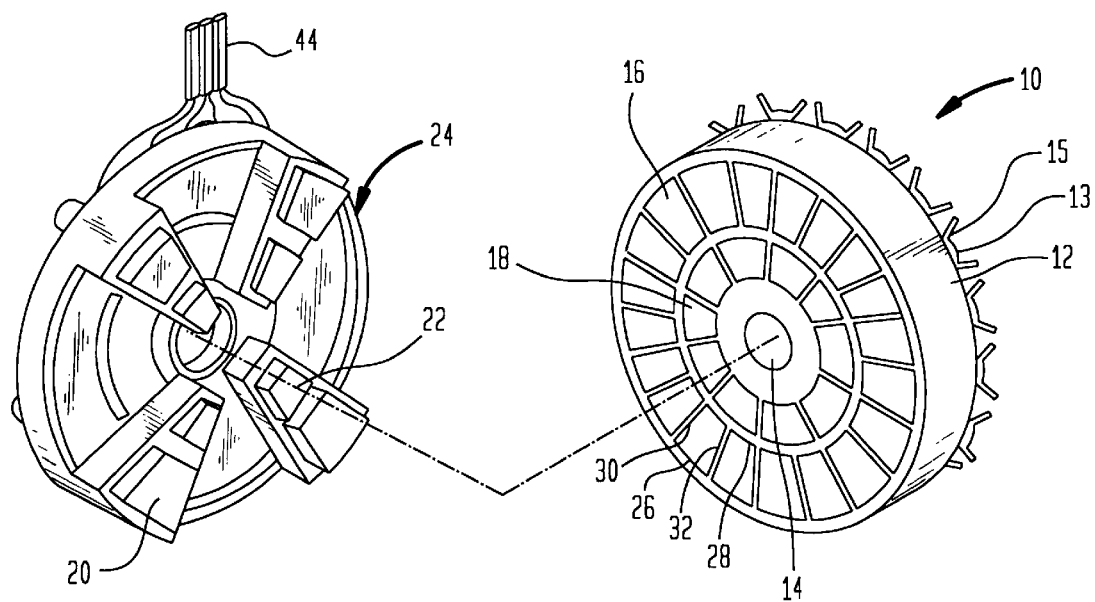
FIG. 1 is a perspective view of a brush card and commutator constructed according to the present invention, with the brush card separated from the commutator for convenience of illustration.

Referring initially to FIG. 1, there is shown a disc-type commutator 10 contemplated for use in a combined armature and commutator assembly according to the present invention. The disc-type commutator 10 shown in FIG. 1 is a two speed commutator contemplated for incorporation into a two speed motor of the type generally disclosed in U.S. Pat. No. 4,910,790. For example, the disc-type commutator 10 is generally comprised of a disc-like support member 12 having a central aperture 14 and a plurality of commutator segments 16 and 18 attached to support member 12 as shown in FIG. 1 for contact by a plurality of corresponding electrically conductive brushes 20 and 22, of brush card 24, also shown in FIG. 1. The commutator carrying disc-like support member 12 is generally molded from a high temperature resinous material, preferably a phenolic resin. However, other suitable resins and other insulating materials may be utilized.

The commutator carrying disc-like support member 12 is provided with a plurality of commutator segments as shown in FIG. 1, with each commutator segment having the general shape of a sector of an annulus. By reference to a sector of an annulus is meant that the annulus is described by dual arcuate edges 26 and 28 respectfully forming part of concentric circles, which have a sector cut therefrom by adjacent radial lines 30 and 32 as shown in FIG. 1. In the embodiment shown in FIG. 1 the radially outermost commutator segments 16 is greater in number, preferably twice as many as the radially innermost commutator segments, thereby providing a two speed motor commutator with the radially innermost commutator segments 16 associated with the low speed of the motor and the radially outermost segments 18 associated with the high speed of the motor. A preferred two speed motor construction which incorporates the present invention is shown in FIG. 3. The commutator of this motor includes twenty (20) radially outermost commutator segments 16 and ten (10) radially innermost commutator segments 18 as shown in FIG. 1. A single speed motor construction is shown in FIG. 4.

Figure 2:
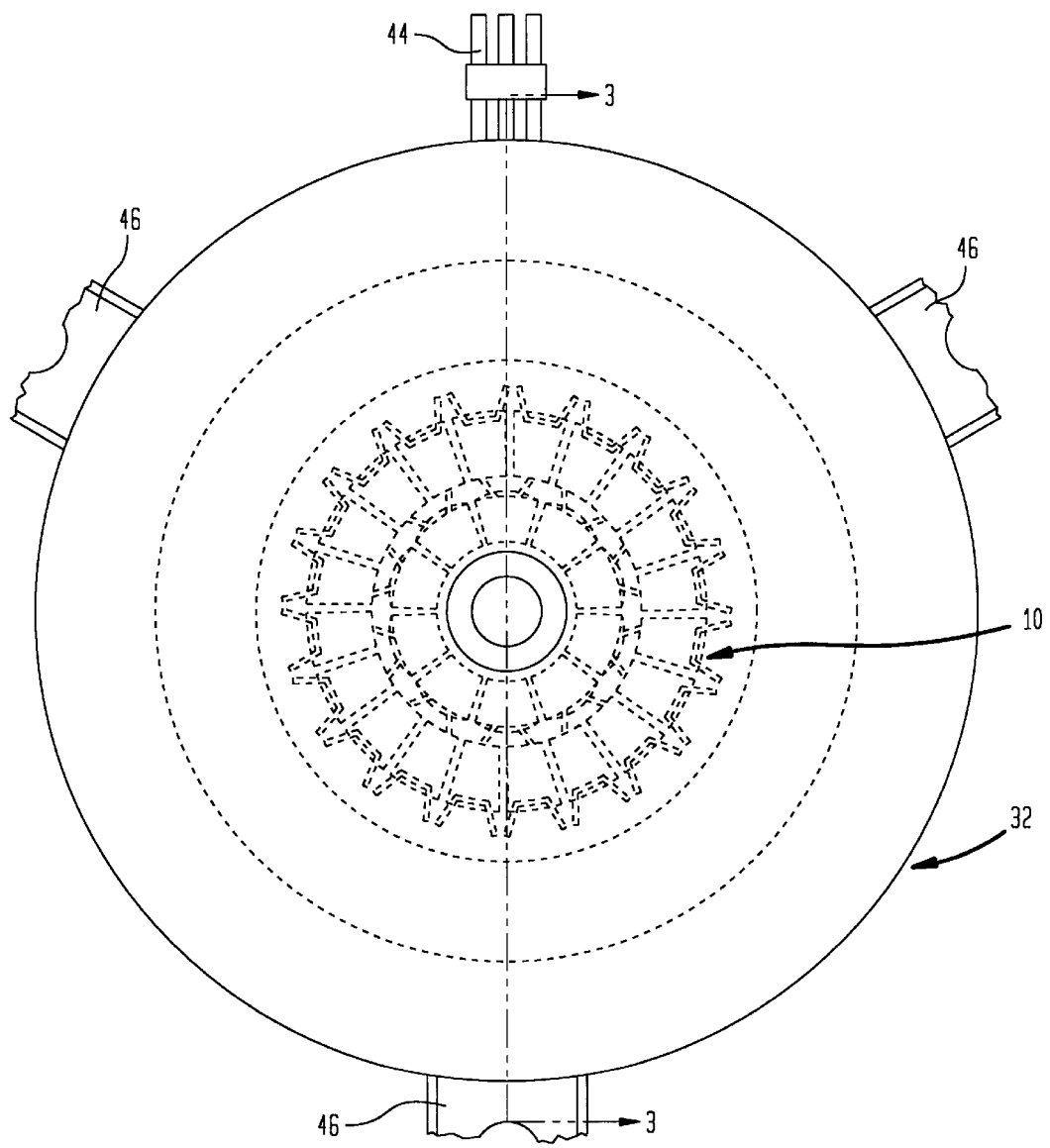
FIG. 2 is front elevational view of an electric motor which incorporates the commutator of FIG. 1 in a combined armature and commutator assembly constructed according to the present invention.

Referring now to FIG. 3, there is shown a cross-section of the motor 32, taken along lines 3—3 of FIG. 2, which incorporates a two speed commutator 10 of the type shown in FIG. 1. The commutator 10 is formed of a molded phenolic resinous structural disc-like member 12 and includes a dual plurality of commutator segments 16 and 18 respectively shown and associated with the high speed and low speed of the motor. Armature core 34 is formed of a stack of ferromagnetically compatible steel laminations and is appropriately wired with electrically conductive windings 36 to create a suitable armature for a two speed motor of the type shown. The two speed wiring arrangement is not shown, but is well known to persons skilled in the art. One example is disclosed in the above mentioned U.S. Pat. No. 4,910,790. Alternatively, the laminations may be formed of a resin bonded matrix of ferromagnetically compatible steel particles, or the core may be made of a solid ferromagnetic material.

Referring once again to FIG. 3 in conjunction with FIGS. 1 and 2, the motor 32 which is shown includes a phenolic resinous housing 38 provided with a flux ring, a plastic resinous fan hub 39, and a plastic resinous rear cover plate 42 which includes bus bars 44 at the upper portion. Mounting bracket 46 shown at the lower portion of FIG. 3 is one of three equally spaced brackets formed integrally with rear cover plate 42 as shown in FIG. 2, and is used to mount the motor to a shroud or other support. The bus bars 44 are appropriately wired to the brushes 20 and 22 of brush card 24 shown in FIG. 1. The housing 38 includes within the inner periphery thereof a plurality of permanent magnets 47 as shown in FIG. 3. Alternatively the magnetic field may be variably created by field windings, or the housing 38 may be made of a ferromagnetic material such as steel, in which case the flux ring is not needed.

The armature core 34 is completely spokeless as shown, in that radial spokes which generally support the armature core on the bearing mounted shaft 40 in the prior art have been eliminated. In particular, the shaft 40 is mounted to housing 38 by front ball bearing unit 48 and at the rear by bearing unit 50. Disc-type commutator 10 as shown in FIG. 1 is mounted on shaft 40 and extends radially outwardly so as to contact and support the armature core 34 and windings 36 on shaft 40.

In the embodiment shown in FIG. 3 the commutator is preferably attached to the armature core by dimensioning the disc-like commutator 10 so as to be pressed into the central opening 52 of the armature core 34 in an interference relation with the inner surface of the opening, so as to be rotatably fixed to each other, whereby rotation of the disc-like support member 12 is effected by rotation of the armature. Thus all torque will be transmitted from the armature core 34 directly to the commutator disc-like member 12. The commutator disc-like support member 12 is in turn rotatably attached to the shaft 40 by known means. Commutator hooks 13 extend through apertures in the support member 12 to the opposite side thereof for electrical connection by fusing or the like to armature wires 15 as shown. Alternatively, the commutator disc-like member 12 may be rotatably attached to the armature core 34 by other known mechanical fastening techniques or by utilizing a high strength adhesive material which would be capable of transmitting the torque from the commutator to the armature core without destruction of the attachment by shear forces therebetween. In such instance, it may be preferable to include a mechanical attachment in combination with a high strength resinous adhesive to accomplish the torque transmitting connection between the commutator 10 and the armature core 34. For example, the armature core 34 could be configured to include dove-tail shaped cut-out portions (not shown) which receive correspondingly shaped peripheral portions or correspondingly and complementarily shaped peripheral portions of the commutator disc-like member 12. In either embodiment, additional reinforcement could be provided therebetween by a high strength adhesive material. For purposes of the present disclosure the preferred technique is to provide an interference fit relation between the commutator disc-like member 12 and the and armature core 34.

Referring now to FIG. 4 a single speed motor is shown wherein like components to the motor of FIG. 3 are identified by the same numerals with "100" being added. Thus, whereas the two speed commutator in FIG. 3 is identified by the numeral "10", the single speed commutator shown in FIG. 4 is identified by the numeral "110".

In FIG. 4 a single speed motor 132 similar to the two-speed motor 32 shown in FIG. 3 is illustrated. The motor 132 includes an armature core 134 and windings 136 similar to the armature shown in FIG. 3. Rotor shaft 140 is rotatably supported by front ball bearing 148 and rear bearing 150, with a single circular array of commutator segments 116 being provided on commutator disc-like support member 112. A brush card 124 includes a single plurality of conductive brushes 120 to accommodate a single speed motor. The front fan hub 139 and the rear cover plate 142 are preferably formed of a molded resinous material. However, as in the embodiment of FIG. 3, alternative materials may include metals or other suitable materials. Plastic housing 138 includes a flux ring. Alternatively, the housing may be of steel construction, in which case the flux ring is not needed. The single speed commutator 111 shown in FIG. 4 is mounted at 154 to the rotor shaft 140 in a known manner and is preferably interference fitted into the central opening 152 of the armature core 134 by dimensioning the plates of the armature core 134 and the outer periphery of the commutator disc 112 so as to provide an interference relation therebetween. However, as indicated hereinabove with respect to the embodiment of FIG. 3, the commutator 112 may also be adhesively attached to the armature core 134 by a suitable high strength adhesive either alone or in combination with a mechanical attachment technique. Such mechanical attachments may be made by mechanical fasteners or by configuring the components in a complementary manner such as by dove-tailing the inner opening 152 of the armature core 134 and the corresponding outer peripheral portions of the commutator disc 112. Thus as in the embodiment of FIG. 3, all torque transmitted to the armature core 134 will be transmitted through commutator disc 112. Commutator hooks 113 extend through apertures in the support member 112 to the opposite side thereof for electrical connection by fusing or the like to armature wires 115 as shown.

Referring once again to FIG. 4 magnets 147 are mounted within the inner periphery of the housing 138 to provide a magnetic field. These magnets are preferably fixed magnets. Alternatively, variable electrically created magnets may be used, the latter type not being shown in the drawings.

It will be readily appreciated that by attaching the outer portion of the commutator directly to the inner opening of the armature core stack of laminations, the commutator provides the only interface between the armature core and the rotor shaft. Thus, the laminations which form the armature core can now be identical, thus eliminating the need for several lamination configurations. In prior art armatures, some laminations had spokes and some did not in order, to minimize armature weight. Furthermore, the shaft/commutator and the commutator/lamination interface is contemplated to be sufficiently resilient to withstand automotive underhood temperatures, vibration, and all the torque which is transmitted therethrough.

Although the individual wiring and connections thereof are not shown in detail in the drawings, such wiring and connections for a two speed motor of the type shown in FIG. 3, or the one-speed motor of the type shown in FIG. 4 are well known and should be readily obvious to persons skilled in the art. It is sufficient to state that the structure and the arrangement of the components as described hereinabove form the major feature of the present invention, wherein a combined armature and structurally supportive commutator is provided for electric motors of the type described. The arrangement described will facilitate the production of a relatively compact motor wherein the commutator provides the dual function of structurally supporting the core-type armature on the motor shaft, while being positioned in the same space along the axial length of the shaft as is the core-type armature, thereby providing a motor of a relatively short length in comparison to known core-type armature motors. Furthermore, other types of armature and commutator combinations, including cylindrical or barrel type commutators, may be utilized in connection with the present invention without departing from the scope thereof.

What is claimed is:

1. A combined armature and commutator assembly for an electric motor, which comprises:

a) an armature core having armature windings positioned around said armature core; and b) a commutator adapted for contact by electrically conductive brushes of the motor for conducting electrical current to said armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being attached directly to said armature core to rotatably support said armature core on the rotor shaft of the electric motor.

2. The combined armature and commutator assembly according to claim 1, wherein said commutator is formed of a generally annular shaped structural support member having a plurality of electrically conductive commutator segments positioned thereon for contact with conductive brushes of the motor.

3. The combined armature and commutator assembly according to claim 2, wherein said generally annular shaped structural support member is a disc-like structural support member and is molded of an electrically insulating material.

4. The combined armature and commutator assembly according to claim 3, wherein said disc-like structural support member has at least two opposed annular shaped surface portions, and said commutator segments are positioned on one of said annular shaped surface portions.

5. The combined armature and commutator assembly according to claim 4, wherein said commutator segments each have a configuration of a sector of an annulus.

6. The combined armature and commutator assembly according to claim 5, wherein said commutator segments are positioned in a circular array on said surface portion of said disc-like structural support member for contact with the electrically conductive brushes of the motor.

7. The combined armature and commutator assembly according to claim 6, wherein at least two circular arrays of commutator segments are positioned on said surface portion of said disc-like structural support member for operation within a two speed motor, one circular array being associated with a first motor speed, and said second circular array being associated with a second motor speed.

8. The combined armature and commutator assembly according to claim 7, wherein said outer circular array includes twenty commutator segments, and said inner circular array includes ten commutator segments.

9. The combined armature and commutator assembly according to claim 3, wherein said disc-like structural support member is molded of a resinous material.

10. The combined armature and commutator assembly according to claim 1, wherein said armature core comprises a plurality of laminate plate members which define a generally central opening, and said commutator is positioned within said generally central opening.

11. The combined armature and commutator assembly according to claim 10, wherein said commutator is dimensioned to be received within said opening in said armature core in interference relation therewith.

12. The combined armature and commutator assembly according to claim 11, wherein said generally central opening of said armature core is dimensioned to receive said commutator in an interference fit relation.

13. The combined armature and commutator assembly according to claim 1, wherein said armature core is comprised of a solid ferromagnetic material.

14. The combined armature and commutator assembly according to claim 13, wherein said commutator is dimensioned to be received within said opening in said armature core in interference relation therewith.

15. A combined armature and commutator assembly for an electric motor, which comprises:
a) an armature core formed of a plurality of laminate plate members defining a generally central opening and having armature windings positioned around said armature core; and
b) a commutator adapted for contact by electrically conductive brushes of the motor for conducting electrical current to said armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being positioned within said generally central opening of said armature and attached directly to said armature core in a manner to rotatably support said armature core on a shaft of the electric motor.

16. An electric motor comprises:
a) a stator having:
1) a generally cylindrical housing having one end open and the other end closed;
b) a rotor having a rotor shaft and including:
1) a combined armature and commutator assembly positioned within said housing and including:
(i) an armature core formed of a plurality of laminate plate members defining a generally central opening and having armature windings positioned around said armature core; and
(ii) a commutator having a plurality of electrical contacts and adapted for contact by conductive brushes of the motor for conducting electrical energy to said armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being positioned within said generally central opening of said armature core and attached directly to said armature core for rotatably supporting said armature core on said rotor shaft;
c) a plurality of electrically conductive brushes positioned for electrical contact with said conductive commutator segments of said commutator;
d) means for rotatably mounting said commutator on said rotor shaft whereby rotation of said armature core and windings causes corresponding rotation of said commutator; and
e) a plurality of permanent magnets positioned within said housing and around said rotor to provide a magnetic field within said housing.

17. The electric motor according to claim 16, wherein said outer array has twenty commutator segments and said inner array has ten commutator segments.

18. An electric motor which comprises
a) a housing;
b) a rotor positioned within said housing and including:
1) a rotor shaft rotatably mounted within said housing;
2) an armature core having a generally central opening and armature windings wound therearound; and
3) a commutator for directing electric current from a plurality of electrically conductive brushes to the armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being positioned within said generally central opening of said armature core and being directly attached to said armature core by interference fit relation to rotatably support said armature core on said rotor shaft.

19. The electric motor according to claim 18, wherein said commutator is attached to said armature core by dimensioning said generally central opening of said armature core and said commutator such that said commutator is received within said generally central opening by an interference fit relation therebetween.

20. The electric motor according to claim 18, wherein said outer array of commutator segments has twice as many commutator segments as said inner array.

21. The electric motor according to claim 20, wherein said outer array has twenty commutator segments and said inner array has ten commutator segments.

22. The combined armature and commutator according to claim 18, wherein said commutator segments comprise hooks connected to said armature windings, said hooks extending from one side of said structural support member through apertures in said support member to the opposite side thereof.

23. The electric motor according to claim 18, wherein said rotor is adapted to provide one motor speed and said commutator comprises a disc-like structural support member having at least one annular shaped surface portion and one circular array of commutator segments attached to said annular shaped surface for contact by brushes.

24. The combined armature and commutator according to claim 23, wherein said commutator segments comprised hooks connected to said armature windings, said hooks extending from one side of said structural support member through apertures in said support member to the opposite side thereof.

25. A combined armature and commutator assembly for an electric motor, which comprises:
 a) an armature core having armature windings positioned around said armature core; and
 b) a commutator adapted for contact by electrically conductive brushes of the motor for conducting electrical current to said armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being attached to said armature core to rotatably support said armature core on a rotor shaft of the electric motor, and being a disc-like structural support member molded of an electrically insulating material and having at least two opposed annular shaped surface portions, at least one of said annular shaped surface portions having a plurality of conductive commutator segments positioned thereon for contact with conductive brushes of the motor.

26. An electric motor comprises:
 a) a stator having:
  1) a generally cylindrical housing having one end open and the other end closed;
 b) a rotor having a rotor shaft and including:
  1) a combined armature and commutator assembly positioned within said housing and including:
   (i) an armature core formed of a plurality of laminate plate members defining a generally central opening and having armature windings positioned around said armature core; and
   (ii) a commutator having a plurality of electrical contacts and adapted for contact by conductive brushes of the motor for conducting electrical energy to said armature windings, said commutator having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being positioned within said generally central opening of said armature core and attached to said armature core for rotatably supporting said armature core on the rotor shaft, said commutator comprising a disc-like structural support member having at least one annular shaped surface portion and at least two concentric circular arrays of conductive commutator segments attached to said at least one annular shaped surface portion, an outer array and an inner array;
 c) a plurality of electrically conductive brushes positioned for electrical contact with said conductive commutator segments of said commutator;
 d) means for rotatably mounting said commutator on said rotor shaft whereby rotation of said armature core and windings causes corresponding rotation of said commutator; and
 c) a plurality of permanent magnets positioned within said housing and around said rotor to provide a magnetic field within said housing.

27. An electric motor which comprises:
 a) a housing;
 b) a rotor positioned within said housing and including:
  1) a rotor shaft rotatably mounted within said housing;
  2) an armature core having a generally central opening and armature windings wound therearound;
  3) a commutator for directing electric current from a plurality of electrically conductive brushes to the armature windings, said commutator being a disc-like structural support member and having at least two opposed annular shaped surface portions, each having an annular array of commutator segments in concentric relation, a first inner array being associated with a lower motor speed and a second outer array being associated with a higher motor speed, said second outer array including at least twice the number of commutator segments as said inner array, said commutator being positioned within said generally central opening of said armature core, said generally central opening of said armature being dimensioned less than the dimension of said disc-like structural support member whereby said disc-like structural support member is attached to said armature core by interference fit relation to rotatably support said armature core on said rotor shaft, said commutator comprising a disc-like structural support member having at least one annular shaped surface portion and at least two concentric arrays of commutator segments attached to said annular shaped surface portion, an outer array and an inner array, whereby said rotor is adapted to provide at least two motor speeds.

28. The electric motor according to claim 27, wherein said outer array has twenty commutator segments and said inner array has ten commutator segments.

29. The combined armature and commutator according to claim 27, wherein said commutator segments comprised hooks connected to said armature windings, said hooks extending from one side of said structural support member through apertures in said support member to the opposite side thereof.

* * * * *